(12) United States Patent
Nielsen et al.

(10) Patent No.: US 8,803,350 B2
(45) Date of Patent: Aug. 12, 2014

(54) METHOD AND CONTROLLER FOR CONTROLLING AN ELECTRIC POWER PRODUCTION UNIT, IN PARTICULAR A WIND TURBINE

(75) Inventors: Kaj Skov Nielsen, Issaquah, WA (US); Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 115 days.

(21) Appl. No.: 13/533,217

(22) Filed: Jun. 26, 2012

(65) Prior Publication Data

US 2013/0001946 A1 Jan. 3, 2013

(30) Foreign Application Priority Data

Jun. 29, 2011 (EP) .................................... 11171899

(51) Int. Cl.
*F03D 9/00* (2006.01)
*H02P 9/04* (2006.01)

(52) U.S. Cl.
USPC .............................................. 290/44; 290/55

(58) Field of Classification Search
USPC .................................................... 290/44, 55
See application file for complete search history.

(56) References Cited

U.S. PATENT DOCUMENTS

| | | | | |
|---|---|---|---|---|
| 6,465,910 B2* | 10/2002 | Young et al. | ..................... | 307/64 |
| 7,061,139 B2* | 6/2006 | Young et al. | ..................... | 307/45 |
| 7,072,194 B2* | 7/2006 | Nayar et al. | ..................... | 363/71 |
| RE39,710 E * | 7/2007 | Young et al. | ..................... | 307/64 |
| 8,121,738 B2* | 2/2012 | Teichmann et al. | ........... | 700/287 |
| 8,244,406 B2* | 8/2012 | Momoh | ......................... | 700/291 |
| 8,291,243 B2* | 10/2012 | Castelli et al. | ................ | 713/320 |
| 8,315,745 B2* | 11/2012 | Creed | .......................... | 700/295 |
| 8,384,243 B2* | 2/2013 | Adest et al. | ..................... | 307/43 |
| 8,612,058 B2* | 12/2013 | Khajehoddin et al. | ........ | 700/287 |
| 8,618,692 B2* | 12/2013 | Adest et al. | ..................... | 307/58 |
| 8,659,188 B2* | 2/2014 | Adest et al. | ..................... | 307/117 |
| 8,682,498 B2* | 3/2014 | Haugh | .......................... | 700/295 |
| 2002/0109410 A1* | 8/2002 | Young et al. | ..................... | 307/64 |
| 2003/0025397 A1* | 2/2003 | Young et al. | ..................... | 307/64 |
| 2010/0106982 A1* | 4/2010 | Castelli et al. | ................ | 713/300 |
| 2010/0268579 A1* | 10/2010 | Momoh | ......................... | 705/14.1 |
| 2010/0274407 A1* | 10/2010 | Creed | .......................... | 700/295 |
| 2011/0076576 A1* | 3/2011 | Otsuka et al. | ................. | 429/423 |
| 2011/0076577 A1* | 3/2011 | Otsuka et al. | ................. | 429/423 |
| 2011/0116290 A1* | 5/2011 | Boys | .............................. | 363/65 |
| 2011/0144817 A1* | 6/2011 | Teichmann et al. | ........... | 700/287 |
| 2011/0180522 A1* | 7/2011 | Bunker et al. | ............. | 219/130.21 |
| 2011/0273015 A1* | 11/2011 | Adest et al. | ..................... | 307/43 |
| 2011/0273016 A1* | 11/2011 | Adest et al. | ..................... | 307/52 |
| 2013/0013123 A1* | 1/2013 | Ozaki | .......................... | 700/295 |
| 2013/0166085 A1* | 6/2013 | Cherian et al. | ................ | 700/291 |

(Continued)

FOREIGN PATENT DOCUMENTS

EP 1959534 A1 8/2008
WO WO 2011012134 A1 2/2011

*Primary Examiner* — Pedro J Cuevas

(57) ABSTRACT

A method for controlling an electric power production unit, in particular a wind turbine, connected to a utility grid, includes obtaining information regarding an event at a point in time, wherein the event relates to at least one of electric power delivered to the utility grid and electric power extracted from the utility grid at the point in time, and automatically adapting, before the point in time, a power transfer between the power production unit and the utility grid based on the information. Further a corresponding controller and a wind park are described.

12 Claims, 3 Drawing Sheets

(56) References Cited

U.S. PATENT DOCUMENTS

| | | | |
|---|---|---|---|
| 2013/0188397 A1* | 7/2013 | Wu et al. | 363/17 |
| 2013/0193945 A1* | 8/2013 | Adest et al. | 323/299 |
| 2013/0207468 A1* | 8/2013 | Wu et al. | 307/31 |
| 2013/0207482 A1* | 8/2013 | Madawala et al. | 307/104 |
| 2013/0207601 A1* | 8/2013 | Wu et al. | 320/108 |
| 2013/0214591 A1* | 8/2013 | Miller et al. | 307/9.1 |
| 2013/0241203 A1* | 9/2013 | Kleen et al. | 290/52 |
| 2013/0264824 A1* | 10/2013 | Gupta et al. | 290/44 |
| 2013/0320674 A1* | 12/2013 | Ingram | 290/43 |
| 2014/0049115 A1* | 2/2014 | Adest et al. | 307/77 |
| 2014/0088781 A1* | 3/2014 | Kearns et al. | 700/295 |

* cited by examiner

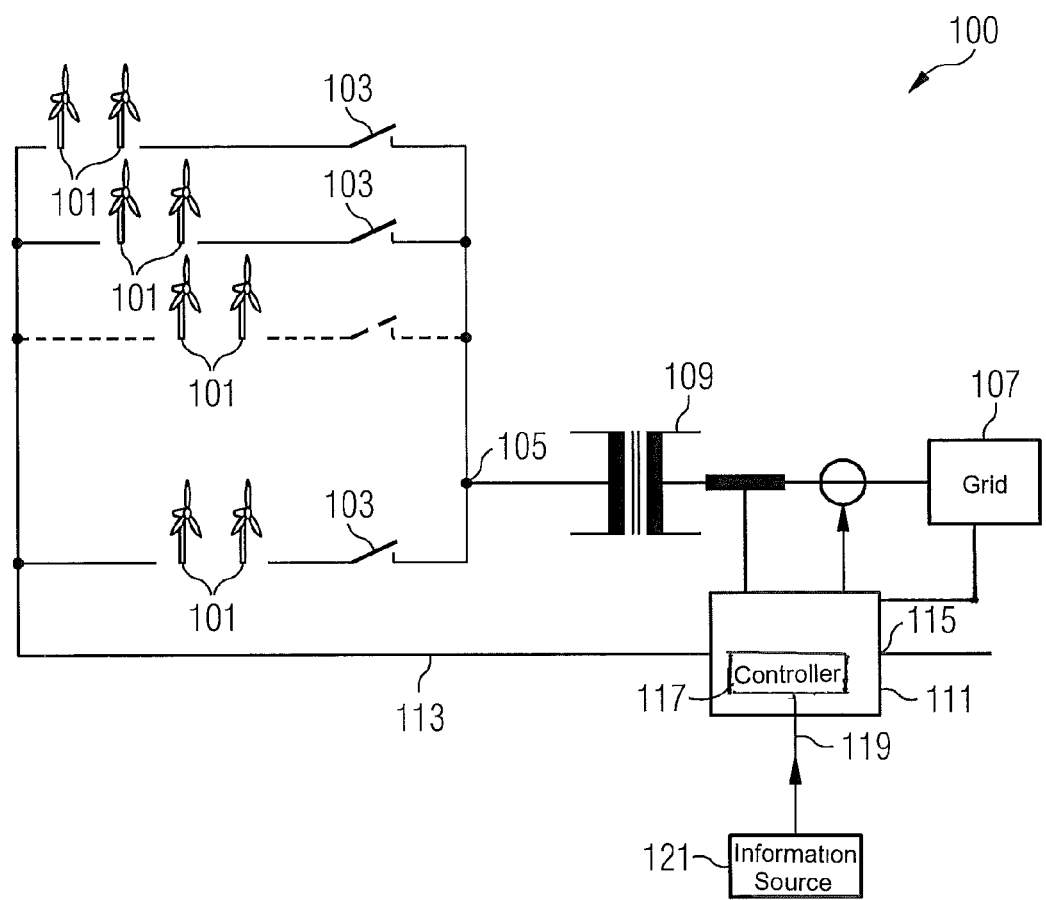

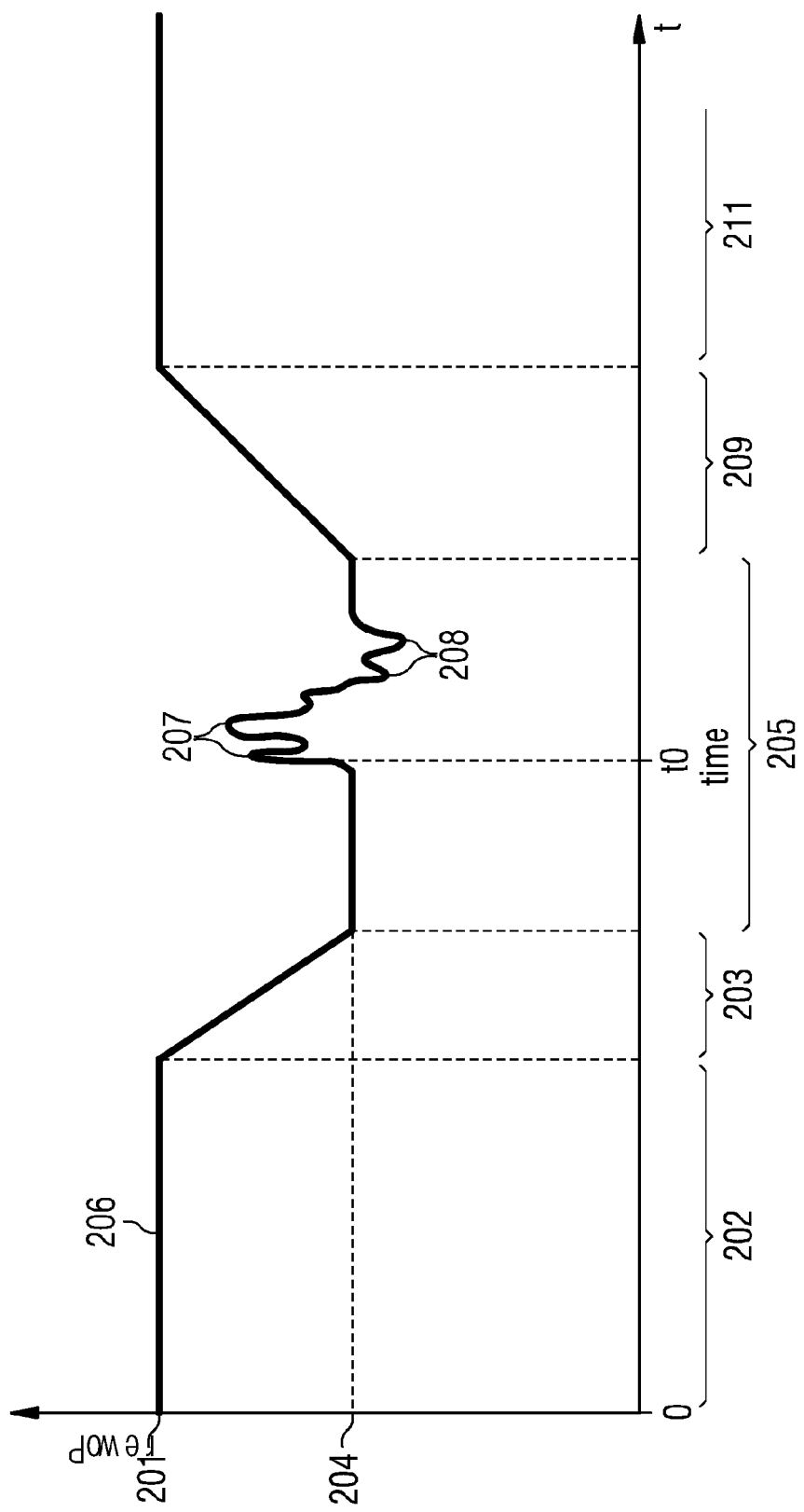

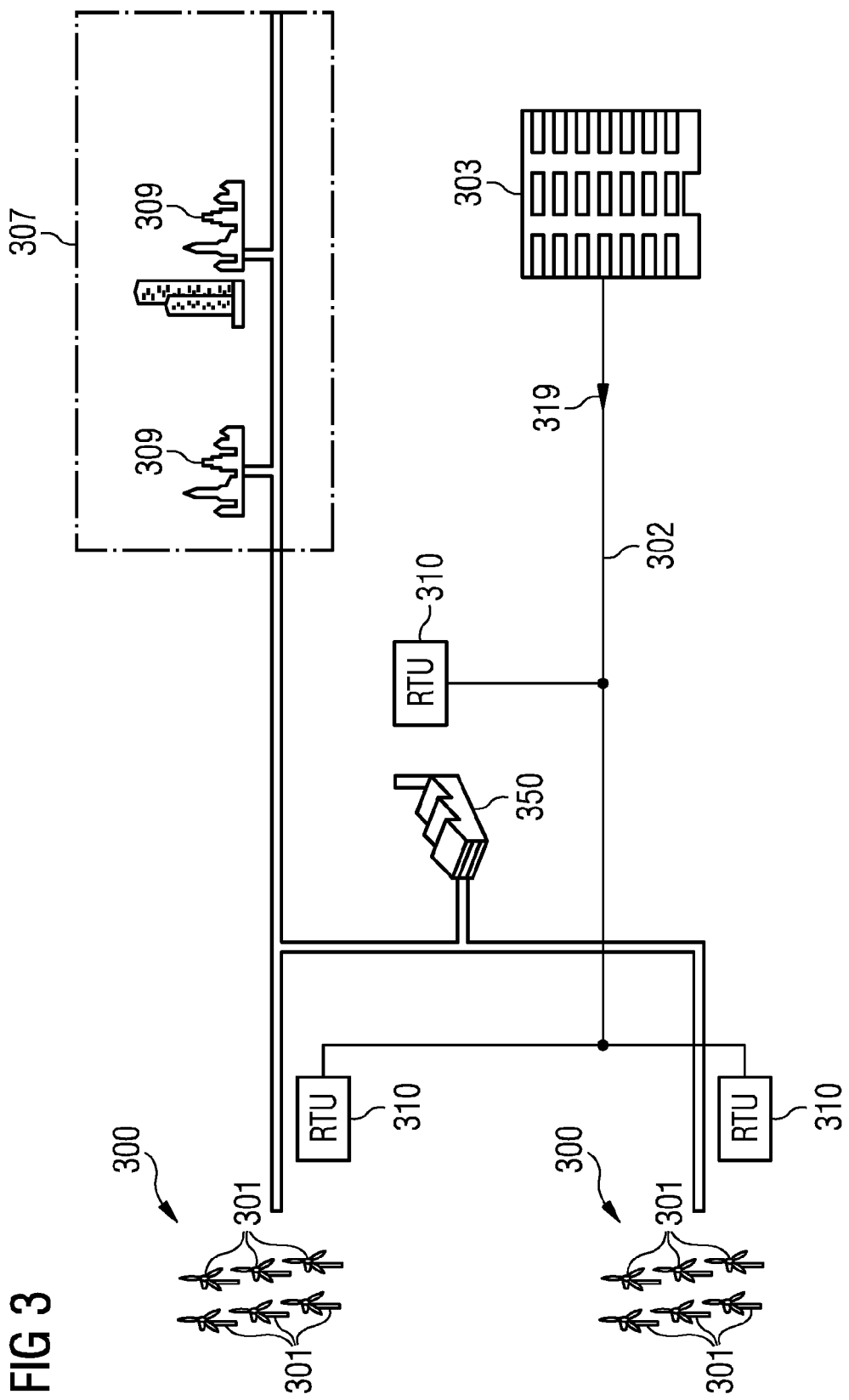

METHOD AND CONTROLLER FOR CONTROLLING AN ELECTRIC POWER PRODUCTION UNIT, IN PARTICULAR A WIND TURBINE

CROSS REFERENCE TO RELATED APPLICATIONS

This application claims priority of European Patent Office Application No. 11171899.5 EP filed Jun. 29, 2011. All of the applications are incorporated by reference herein in their entirety.

FIELD OF INVENTION

A method and a controller for controlling an electric power production unit, in particular a wind turbine are provided. The method and the controller are in particular adapted to adjust the power transfer by the electric power production unit in dependence of an anticipated event in the future.

ART BACKGROUND

A utility grid may provide electric energy to consumers, wherein the electric energy is supplied via an energy stream or a power stream having a predetermined frequency, such as 50 Hz or 60 Hz. While consumers extract electric energy from the utility grid, electric power production units or electric power production plants supply electric energy into the utility grid. If a balance between extracted energy and supplied energy is disturbed, the grid frequency will change. Thereby, in order to maintain the frequency of the utility grid at the predetermined grid frequency, there the extracted energy and the supplied energy must balance.

In particular, when more energy or more power is extracted from the utility grid than power is supplied to the utility grid, the frequency of the utility grid drops. Thereby, problems occur regarding operation of electrical devices which are supplied with electric energy from the utility grid. In particular, these electrical devices may not operate properly or may even be damaged by the supplied electric energy not having the predetermined grid frequency.

SUMMARY OF THE INVENTION

There may be a need for a method and for a controller for controlling an electric power production unit, in particular a wind turbine, wherein a balance of power extracted from the utility and power supplied to the utility grid may be improved, in order to stabilize the grid frequency.

This need may be met by the subject matter according to the independent claims. Advantageous embodiments are described by the dependent claims.

According to an embodiment, a method for controlling (in particular controlling a power output) an electric power production unit (a device or arrangement for generating electric power in particular from mechanical power, wherein the generated electric power may have a particular frequency corresponding to a grid frequency according to which current and/or voltage vary in a periodic manner), in particular a wind turbine (which may in particular comprise a wind turbine tower, a nacelle mounted at the top of the tower, wherein a rotor shaft is rotatably supported within the nacelle, wherein at the rotor shaft one or more rotor blades are mounted, wherein the rotor shaft is mechanically connected to a generator which generates a in particular variable frequency energy stream which is then supplied to a converter for converting the variable frequency energy stream to a fixed frequency energy stream having the frequency of the utility grid), connected to a utility grid (being provided for supplying electric energy having a predetermined grid frequency to one or more consumers, such as electrical devices) is provided.

Thereby, the control method comprises obtaining (in particular involving any communication method, such as an electronic communication via a network, such as the internet, using for example email, SMS, telephone communication or any other network protocol) information (in particular text information, which may be received in an electronic form) regarding an event at a point in time (wherein the event may for example relate to or caused by a weather change, to a broadcast event, a cultural event, a social event, a sports event, a political event, or the like) at a point in time, wherein the event is related to at least one of electric power delivered to the utility grid (such as when the event relates to or is caused by changing wind speed conditions which may then influence an amount of power produced and delivered to the utility grid) and electric power extracted from the utility grid (such as when for example the event relates to or is caused by a start of an operation of a factory, or to a start of a broadcasting event or to a break in a broadcasting event or relates to or is caused by a synchronized consumer behavior or simultaneous consumer demand triggered by the broad cast event) at the point in time (or at a later point in time); and automatically (such as by a processor or controller controlling the power production unit) adapting (in particular changing, such as increasing or decreasing depending on the prediction), before the point in time (thus, the event has not occurred yet), a power transfer (in particular an amount of power supplied to the utility grid) between the power production unit and the utility grid based on the prediction.

The power production unit may e.g. be a wind turbine or a wave energy power production unit.

In particular, an increase or decrease of power extracted from the utility grid may be derivable based on the information regarding the event at the point in time. In particular, the electric power production unit may be adapted ahead of the occurrence of the event at the point in time in order to prepare the electric power production unit for the anticipated change in the power extracted from the utility grid at the point in time.

In particular, other control mechanisms which may be based on detection of frequency variations in the utility grid and the control may be operated with less sensitive settings and with no or only smaller amount of spinning reserve during the automatically adapting the power transfer according to the control method according to an embodiment. In particular, before the point in time the grid frequency may be stable. Nevertheless, the electric power production unit may be controlled such that power supplied to the utility grid may for example be decreased or increased.

In order to nevertheless keep a balance between power supplied to the utility and power extracted from the utility grid one or more further electric power production units may in turn adapt a power transfer between the further power production units and the utility grid, in particular in a reverse or complementary manner.

In particular, embodiments provide for maintaining a grid balance during large ramping events using power producing units having fast ramping capabilities, such as wind power plants having full power inverters (also called converters).

In particular, a converter of a wind turbine may be automatically (thus not manually) adapted to adjust power supplied from the wind turbine to the utility grid as desired. In particular, the converter may comprise a first stage comprising one or more power transistors (such as IGBTs) for converting a variable frequency alternating current (AC) power stream or power signal delivered from the generator of the wind turbine to a substantially direct current (DC) power signal or power stream. Further, the converter may comprise a second stage comprising one or more power transistors (such as isolated gate bipolar transistors, IGBT) for converting the DC energy stream to a fix frequency AC energy stream having the frequency of the utility grid. Conducting states of the power transistors in the first stage and in the second stage may be controlled via control of their corresponding gates. In particular, the gates of the power transistors may be switched at a high frequency and may be in particular switched such that power output from the wind turbine and supplied to the utility grid has a predetermined selectable frequency, shift between voltage and current and power. These properties of the converter allow controlling a power output of the wind turbine on demand.

In particular, an embodiment deals with challenges posed during large ramping events regarding need of electric energy. According to an embodiment, such ramping events occur at the point in time. Examples of the event include or are caused by an anticipated weather condition, proper ballistic large scale simultaneous consumer behavior resulting in large changes in power demand, such as TV broadcasted sports event or the like.

In particular, the event may be classified according to four different categories, in particular production increase, production decrease, consumption increase and consumption reduction. In particular, any of the above events or any combination of the above events may result in frequency variations in a conventional system. According to an embodiment, such grid frequency variations are reduced, in particular taking advantage of the controllability of the power electronics in large scale wind power plants. Thereby, the costs of managing predicted ramp events could be reduced and also the response time could be reduced.

According to an embodiment, a set of combined functions is provided addressing the anticipated grid events. Thereby, a method for controlling one or more power producing units (such as wind turbines) is provided, in order to maintain grid balance during large ramping events in the grid, wherein the method comprises changing the mode of operation of the power producing units prior to an anticipated/predicted grid event (thus before the point in time), and changing the mode of operation of the power producing units back to the mode of operation onset of the anticipated predicted event.

Thereby, grid events may mean production increase, production decrease, consumption increase or consumption reduction. In particular, the power producing units may be wind turbines having full converters and fast ramping capabilities, but it could also be other types of power producing units harvesting wave energy or the like or it might be utilizing stored energy.

According to an embodiment, the information indicates the point in time at which the electric power delivered to the utility grid and/or the electric power extracted from the utility grid will change. Thereby, the power production unit can prepare for the event well ahead (i.e. before) of the occurrence of the event.

According to an embodiment, the information indicates a magnitude of a change of the electric power delivered to the utility grid and/or a magnitude of a change of the electric power extracted from the utility grid at the point in time. Thereby, the power production unit may be adapted to change its energy transfer for a particular amount.

According to an embodiment, the event is caused by a behavior of consumers connected to the utility grid.

In particular, the event may relate to or may be caused by a break for commercials or the like in a popular TV show, where many viewers go to the kitchen to heat water or coffee or tea. Thus, based on the time information, when the break will start, it may be predicted that the power extracted from the utility grid will increase due to the consumer behavior. In particular, ahead of the point in time where the break for commercials will start, the electric power production unit, in particular a wind turbine, may be ramped down (thus producing less energy or less power than a nominal power), while further power production plants, such as a gas power production plant, a thermal power production plant or others may ramp up (thus increasing production from partial production to full production). In particular, the further electric power production units which ramp up ahead of the point in time may not have the capability to respond as fast to frequency variations than the wind turbine which has been ramped down. In particular, ramping down the wind turbine ahead of the predicted increase or power demand by the consumers connected to the utility grid then allows fast increase of power supplied by the wind turbine to the utility grid when the increase in power demand actually starts at the point in time or in a time span around the point in time. Thereby, the grid frequency may be effectively stabilized during the actual sudden increase in energy or power demand starting at the event.

In particular, embodiments may handle a situation which is referred to as the "kettle syndrome". In a conventional system the grid frequency will drop rapidly, if more power is not delivered to the grid.

According to an embodiment, the event may be caused by a schedule of a commercial production (such as starting production in a factory, starting of work for a large number of workers or the like) requiring energy.

In particular, the information may comprise information portions assembled from different information sources. Information sources may comprise broadcast schedules, commercial production schedules, weather conditions, and the like.

According to an embodiment, the event may be caused by a broadcast event (such as a sports event, a commercial during a movie, a popular TV show or the like) starts at the point in time. The event may also comprise or may be caused by a political event, a social event, a business event or an art event.

Taking in account information portions from a variety of information sources may improve controlling or adapting of the power transfer between the power production unit and the utility grid.

According to an embodiment, the adapting the energy transfer is performed during an adaptation time span (in particular a time span during which the power transfer between the power production unit and the utility grid is adapted, in particular increased, maintained and/or increased relative to a nominal level) between 5 minutes, in particular 30 minutes, before the point in time and 5 minutes, in particular 30 minutes, after the point in time. In particular, also the adaptation time span may be predicted and/or adapted based on the information regarding the event at the point in time. Thereby, the control method may further be improved to even better balance or stabilize the grid frequency.

According to an embodiment, the automatically adapting the power transfer comprises automatically changing a power production by the power production unit supplied to the utility grid from a nominal level (which may represent in particular an available power level given the current weather conditions) to an adapted level (which may in particular be different from the nominal level), which is in particular smaller, in particular at least 5% smaller, or at least 10% smaller (or at least 20% smaller) than the nominal level.

In particular, a difference between the adapted level and the nominal level may be selected such as based on a predicted increase of power demand at the point in time. In particular, the decrease of the power produced by the wind turbine from the nominal level to the adapted level may increase a range or a maneuvering room in which the wind turbine is able to quickly change, in particular increase, power output, to be appropriately prepared for the anticipated increase in power demand by the consumers connected to the utility grid. In particular, the wind turbine may be prepared to quickly vary its power output within a power range corresponding to the difference between the nominal level and the adapted level.

According to an embodiment, the automatically changing the power production is performed according to a predetermined change rate (a change of power per time) during a predetermined ramp time interval (during which ramp time interval the power output is changed), in particular ranging between 5 minutes and 15 minutes, within the adaptation time span. Thus, a portion of the adaptation time span may comprise ramping the power production by the electric power production unit. Thereby, the control method may be simplified, while at the same time the ramping may be performed at a sufficiently small change rate, such that one or more further electric power production units may at the same time also change their power production, in order to stabilize the grid frequency.

According to an embodiment, the automatically adapting the power transfer comprises setting the production unit in a fast response mode after changing the power production by the power production unit from the nominal level to the adapted level, such that the power production by the production unit may be rapidly changed, in particular increased, upon a change, in particular a drop, of a grid frequency.

In particular, in the fast response mode the electric power production unit may produce electric power based on an obtained, in particular measured, grid frequency. Because of the decrease of the power production from the nominal level to the adapted level the electric power production unit, in particular the wind turbine, is enabled to increase its power production from the adapted level to any level up to the nominal level without causing problems of the operation of the electric power production unit which is rated to operate at the nominal level. Thereby, a durability of the electric power production unit may be improved.

According to an embodiment, the power production unit is adapted to change the power production at a rate of at least 10%, in particular of at least 15%, in particular in a range between 20% and 20%, of a nominal power production level per second. In other embodiments the change rate may be lower or higher. In particular, the possible change rate of the power production of the power production unit is higher, in particular two times higher, further in particular five times higher, than a change rate of power production of one or more further electric power production units, such as thermal power production units, nuclear power production units or the like. The high possible change rate of power production by the electric power production unit may allow for fast response when a grid frequency drop occurs at or after the point in time.

According to an embodiment, the method is further adapted to control at least one further power production unit (such as a thermal power production unit, a nuclear power production unit, a wave energy power production unit or the like) having a less fast power production change rate than the power production unit. Thereby, the at least one further power production unit may directly (e.g. by a control signal based on the event) or indirectly (e.g. based on a drop of grid frequency) be controlled before the point in time regarding a power transfer between the further power production unit and the utility grid based on the information at the point in time or based on a grid frequency.

In particular, while ramping down the electric power production unit at a relatively slow rate, the at least one further power production unit may simultaneously be ramped up, for example based on a measured drop in grid frequency, in order to stabilize the grid frequency. Thereby, in particular ahead of the point in time the power output by the electric power production unit may be decreased, while the power output by the at least one further power production unit may be increased. Thereby, the electric power production unit may be appropriately prepared for the anticipated increase of power demand by the consumers.

According to an embodiment, before the point in time, the power production by the production unit is decreased, in particular ramped down, to the adapted level, while the power production by the further production unit is increased, in particular ramped up, in particular synchronously, to stabilize a grid frequency.

According to an embodiment, after the point in time the power production by the power production unit is increased, in particular ramped up, to the nominal level, while the power production by the further power production unit is decreased, in particular ramped down, in particular synchronously to stabilize a grid frequency.

Thereby, ramping up or ramping down the power production means increasing or decreasing, respectively, the power production proportionally to the time. Bringing the power production unit into its normal operation state to produce the nominal power level may improve the efficiency of the power production unit, since the power production unit may be rated at the nominal level.

According to an embodiment, the adapting the power production by the power production unit comprises adapting a demand of power drawn from a converter of the production unit and/or adapting a rotor blade pitch angle of a rotor blade of the production unit.

In particular, the adapting the power production by the power production unit may be done from a plant or park point of view and may not be performed by the individual turbine controller.

If the output at a plant level is reduced over time, local conditions can result in actual increases in output for a sub set of individual units as the wind speed shifts, but the accumulated production may still be reduced.

In particular, the demand of power drawn from the converter may be controlled by supplying control signals to gates of power transistors comprised in the converter. In particular, adapting the rotor blade pitch angle may comprise rotating one or more rotor blades connected to a rotor shaft of the wind turbine around their corresponding longitudinal axes. In particular, changing the rotor blade pitch angle may change an efficiency of a transfer of kinetic energy comprised in the wind to rotational energy comprised in the rotor of the wind turbine.

It should be understood that any features (individually or in any combination) disclosed, mentioned, described or applied to a method for controlling an electric power production unit may also be applied (individually or in any combination) to a controller for controlling an electric power production unit according to an embodiment and vice versa.

According to an embodiment, it is provided a controller for controlling an electric power production unit, in particular a wind turbine, connected to a utility grid, wherein the controller is adapted to obtain information regarding an event at a point in time, wherein the event relates to at least one of electric power delivered to the utility grid and electric power extracted from the utility grid at the point in time; and to adapt, before the point in time, a power transfer between the power production unit and the utility grid based on the prediction.

In particular, in a very minimalistic fully automated implementation at the wind power plant the information may include:
Remote Parameter:
Date/Time (of event): [MM:DD/hh:mm];
Power Change (due to event): [Delta Power %];
Local Parameter: [Pre-trigger Time];
Power Change: [Ramp Rate];
Frequency Properties: [Frequency Dead Band];
Time Duration of Power Change: [Post-trigger Time].

According to an embodiment, a wind turbine park is provided which comprises at least one wind turbine, in particular comprising a full converter; and a controller according to an embodiment as explained above, wherein the controller is connected to the wind turbine for controlling a power production of the wind turbine.

In particular, the obtained information may include energy production forecast data, weather forecast data, energy consumption forecast data, and/or other forecast data being related to consumption or production of electric power.

It has to be noted that embodiments have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects are apparent from the examples of embodiment to be described hereinafter and are explained with reference to the examples of embodiment.

BRIEF DESCRIPTION OF THE DRAWINGS

Embodiments are now described with reference to the accompanying drawings. The method and/or controller are not restricted to the illustrated or described embodiments.

FIG. 1 schematically illustrates a wind park according to an embodiment;

FIG. 2 schematically illustrates a time course of a power production according to an embodiment; and FIG. 3 schematically illustrates a regional power production system comprising one or more wind parks according to an embodiment.

DETAILED DESCRIPTION

The illustration in the drawings is in schematic form.

FIG. 1 schematically illustrates a wind farm 100, wherein the wind farm 100 comprises a number of wind turbines 101 which are connectable via switches 103 to a point of common connection 105. The wind turbines 101 provide an energy stream having a predetermined nominal frequency (such as 50 Hz or 60 Hz) corresponding to the frequency of the grid during a steady state of a balance of produced energy and consumed energy. To the grid 107 one or more not illustrated consumers consuming energy are connected. The energy stream provided at the point of common coupling 105 has a particular voltage which is transformed to a predetermined (higher) grid voltage using the substation transformer 109. Each of the wind turbines 101 is controlled by an individual controller controlling particular operation states of the wind turbine which are internal to the wind turbine.

In addition to that the wind turbines 101 are controlled by a high performance park pilot (HPPP) 111 which supplies control signals to the wind turbines 101 via the communication line 113. Further, the high performance park pilot receives remote commands via the control line 115 which may e.g. comprise reference set points.

The high performance park pilot 111 comprises a controller 117 for controlling an electric power production unit via a line 113. In particular, the controller 117 is adapted to control one or more of the wind turbines 101 for automatically adapting a power transfer between the wind turbines 101 and the utility grid 107. Thereby, the controller 117 receives or obtains information 119 from an information source 121.

The information source provides information regarding an event affecting an amount of an energy demand of consumers connected to the grid 107 or affecting an amount of energy production. The event may be caused by a broadcast schedule of a TV program, a schedule of commercial production and/or a behavior of consumers and/or other information. The controller 117 obtains the information 119 and thus receives an amount of an increase or a decrease of a demand of energy, wherein this demand of energy relates to a point in time in the future. In particular the information 119 may comprise information regarding a time point, time duration, and/or a relative change of power consumption or production.

In particular the information regarding the event may comprise a time and magnitude of power change of the anticipated event.

The controller 117 may also receive the remote commands and/or reference set points via the control line 115.

In one embodiment, a specific starting time for changing the mode of operation of one or more of the wind turbines 101 is programmed into the controller 117, for instance the expected time t0 for a break in a TV show or the expected time to shut down a big machinery that is connected to the grid 107.

In a further embodiment, the power producing units, i.e. the wind turbines 101 with fast ramping capabilities are purposely ramped down in a controlled manner prior to the predicted grid event. Thereby, the ramp down speed is adapted such that other less flexible power producing units (such as coal or other thermal power plants) may ramp up and absorb more of the pre-event load. Thereby, the grid frequency may be stabilized. The power producing units, i.e. the wind turbines 101, having fast ramp up capabilities are than ramped up at the onset of the predicted event.

The change of operation might be initiated by receiving a request via the data interface to perform a ramping function.

In particular, the information 119 may comprise information about changing the mode of operation prior to a grid event, including time for changing the mode of operation, ramping rates, duration etc.

FIG. 2 illustrates a graph showing on its abscissa the time t and showing on its ordinate the electric power as curve 206 produced by one of the wind turbines 101 illustrated in FIG. 1.

At time 0 the wind turbine 101 (being in a normal operation state) produces power having a nominal level 201. The nominal level 201 may correspond to a rated power production level, at which the wind turbine 101 may be designed to continuously produce electric power without hampering its mechanical and electronic components. Further, the nominal level 201 of the power may correspond to an available power at the current weather and wind conditions. In a time interval 202 the wind turbine 101 is operated according to a normal operation mode, in which the wind turbine 101 produces the nominal power level 201.

The controller 117 illustrated in FIG. 1 receives information 119 regarding an event which will occur at a time t0. The event is predicted to cause a sudden increase and/or fluctuation of electric power demand consumed by the consumers connected to the utility grid 107. Thus, the wind turbine 101 having fast and rapid ramp up capabilities are purposely ramped down during a time interval 203 in order to reach an adapted level 204 of produced power. The ramp down in the time interval 203 involves a linear (with time t) decrease of the electric power output by the wind turbine 101. In particular, the ramp down may be done at a ramp down speed (or power output change per time) allowing other less flexible power producing unit to ramp up and deliver more of the pre-event load.

Within a time interval 205 the wind turbine 101 produces electric power generally having the adapted level 204. However, during the time interval 205 the wind turbine is operated in a fast response mode, wherein the wind turbine 101 or the HPPP 111 operates with sensitive frequency settings to respond to frequency changes and adapt the power output to stabilize the frequency. Thereby, a drop in the grid frequency which may for example occur at the time t0 of the event upon recording the drop of the frequency of the grid the wind turbine 101 or the HPPP 111 may rapidly increase its power output within the time interval 205, in order to stabilize the grid frequency, as indicated by peaks 207. Thus, in particular after the point in time t0 there may be rapid changes (fluctuations) of the produced power (or power supplied to the grid) by the wind turbine 101 which are illustrated in the graph in FIG. 2 as peaks 207 and valleys 208. Shortly after the event at time t0 the wind turbine 101 produces fluctuating amounts of electric power as illustrated in exemplary spikes or peaks 207. Depending on the type of the event at time t0 the spikes 207 may maintain during a portion of the time interval 205 after the event at time t0.

After the event is over and a particular time elapsed the wind turbine 101 may be restored or ramped up in a time interval 209. Thereby, the power output by the wind turbine 101 will be restored to the nominal level 201. Normal operation of the wind turbine 101 is achieved during the time interval 211 which is open to the right-hand side of FIG. 2.

A possible sequence of steps for the wind power plant controller 117 may be the following:

1) Lock the current mode of operation.
2) Ramp the wind power plant down (in time interval 203) in anticipation of the ramping event for the anticipated starting time (at t0).
3) Switch to the predefined frequency response settings during the time interval 205.
4) This could be a trigger level very close to a dead band around the nominal frequency and a proportional gain or other drop factor depending on the measured frequency error value.
5) The wind power plant will now be able to respond in order to quickly produce more power in the interval 205, if the frequency drops, and may reduce the output of the power, if the frequency increases (see for example the valleys 208).
6) The operation with the sensitive frequency settings (the fast response mode) may be maintained or held for a specified duration in the time interval 205.
7) During the time interval 209 the wind turbine 101 may be switched back to the original mode of operation.
8) Thereby, the power output by the wind turbine is ramped to the nominal value 201.

FIG. 3 schematically illustrates a regional system comprising wind power plants 300 and a thermal power plant 350 which are all connected to the utility grid 307 providing electric energy to consumers 309. Further, remote terminal units 310 are provided which communicate via a communication line 302 to a balancing center 303. The balancing center or Grid Operator 303 communicates with a wind park 300 (or the units 310) regarding the anticipated starting time of the ramp, and the time of the ramp event as well as the anticipated duration of the ramping event. Based on this information 319 the wind farms 300 may adapt their power production, in order to perform a method for controlling an electric power production unit according to an embodiment. Further also the thermal power plant 350 may adapt its power output based on the information 319.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

The invention claimed is:

1. A method for controlling an electric power production unit connected to a utility grid, the method comprising:
    obtaining information regarding an event at a point in time, wherein the event relates to at least one of electric power delivered to the utility grid and electric power extracted from the utility grid at the point in time;
    in advance of the event, ramping down power production by the electric power production unit from a nominal power level to an adapted power level; and
    increasing or decreasing power output of the electric power production unit relative to the adapted power level based upon a decrease or increase in grid frequency, respectively.

2. The method according to claim 1, wherein the information indicates the point in time at which electric power delivered to the utility grid and/or electric power extracted from the utility grid will change.

3. The method according to claim 1, wherein the information indicates a magnitude of a change of electric power delivered to the utility grid and/or a magnitude of a change of electric power extracted from the utility grid at the point in time.

4. The method according to claim 1, wherein the event is caused by
    a schedule of a commercial production requiring energy and/or
    a behavior of consumers connected to the utility grid and/or
    a starting time of a broadcast event.

5. The method according to claim 1, wherein the ramping down is done 5-30 minutes before the point in time, and wherein the method further comprises ramping up power production by the electric power production unit from the adapted power level back to the nominal power level after the point in time.

6. The method according to claim 5, wherein the adapted level is at least 10% smaller than the nominal level.

7. The method according to claim 6, wherein the ramping down is performed according to a predetermined change rate during a predetermined ramp time interval, ranging between 5 minutes and 15 minutes.

8. The method according to claim 1, wherein ramping down is done at a rate of between 10% and 20% of a nominal power production level per second.

9. The method according to claim 1, further comprising:
controlling at least one further power production unit having a less fast power production change rate than the power production unit,
wherein the controlling comprises increasing power production of the further power production unit while ramping down power production by the electric power production unit.

10. The method according to claim 1, electric power production unit comprises at least one wind turbine, and wherein the ramping down comprises:
reducing a demand of power drawn from a converter of the power production unit and/or
changing a rotor blade pitch angle of a rotor blade of the wind turbine.

11. Controller for controlling an electric power production unit, in particular a wind turbine, connected to a utility grid, wherein the controller is configured:
to obtain information regarding an event at a point in time, wherein the event relates to at least one of electric power delivered to the utility grid and electric power extracted from the utility grid at the point in time;
in advance of the event, ramping down power production by the electric power production unit from a nominal power level to an adapted power level, wherein power production by the electric power production unit may be increased or decreased upon a change in grid frequency; and
increasing or decreasing power output of the electric power production unit relative to the adapted power level based upon a decrease or increase in grid frequency, respectively.

12. Wind turbine park, comprising:
at least one wind turbine comprising a converter;
a controller which is in communication with the convertor of the at least one wind turbine for controlling a power production of the wind turbine, wherein the controller is configured to:
to obtain information regarding an event at a point in time, wherein the event relates to at least one of electric power delivered from the at least one wind turbine to a utility grid and electric power extracted from the utility grid at the point in time;
in advance of the event, ramping down power production by the electric power production unit from a nominal power level to an adapted power level, wherein power production by the electric power production unit may be increased or decreased upon a change in grid frequency; and
increasing or decreasing power output of the electric power production unit relative to the adapted power level based upon a decrease or increase in grid frequency, respectively.

* * * * *